US012578867B2

(12) United States Patent (10) Patent No.: US 12,578,867 B2
Shukla et al. (45) Date of Patent: Mar. 17, 2026

(54) SOLID STATE DRIVE WITH CONCURRENT READ EXECUTION AND ERASE EXECUTION

(71) Applicant: Microchip Technology Incorporated, Chandler, AZ (US)

(72) Inventors: Pitamber Shukla, San Jose, CA (US); Nian Niles Yang, Mountain View, CA (US); Achyut Chandulal Gedia, Los Gatos, CA (US); Dipali Khamkar, San Jose, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/965,539

(22) Filed: Dec. 2, 2024

(65) Prior Publication Data

US 2026/0056665 A1 Feb. 26, 2026

Related U.S. Application Data

(60) Provisional application No. 63/686,983, filed on Aug. 26, 2024.

(51) Int. Cl.
 *G06F 3/06* (2006.01)
(52) U.S. Cl.
 CPC .......... *G06F 3/0614* (2013.01); *G06F 3/0659* (2013.01); *G06F 3/0679* (2013.01)
(58) Field of Classification Search
 CPC ..... G06F 3/0679; G06F 3/0659; G06F 3/0614
 See application file for complete search history.

(56) References Cited

U.S. PATENT DOCUMENTS

| | | | |
|---|---|---|---|
| 2011/0208905 A1 | 8/2011 | Shaeffer et al. | |
| 2020/0201571 A1 | 6/2020 | Jung et al. | |
| 2021/0255949 A1 | 8/2021 | Guda et al. | |
| 2021/0303173 A1* | 9/2021 | Wu ........................ | G06F 3/0611 |
| 2022/0019536 A1* | 1/2022 | Narsale ............... | G06F 12/0862 |
| 2022/0165340 A1* | 5/2022 | Lee .......................... | G11C 7/22 |

OTHER PUBLICATIONS

International Search Report and Written Opinion for PCT Application No. PCT/US2024/058097 (Dated Apr. 23, 2025).

* cited by examiner

*Primary Examiner* — Jane W Benner
(74) *Attorney, Agent, or Firm* — Hovey Williams LLP

(57) ABSTRACT

A solid-state drive capable of executing a read operation concurrent with executing an erase operation, and a method of executing a read operation concurrent with executing an erase operation in a solid-state drive. A first portion of stored data that has been predicted (based on, e.g., recency of storage, frequency of access, relevancy to other operations) to be the subject of a potential read request is identified, and that data is copied to a page buffer. Subsequently, while executing an erase operation involving second data, an actual read request is received involving a third portion of stored data. The read request is executed without suspending the erase operation when the third portion of stored data is included in the first portion of stored data in the page buffer, and the erase operation is suspended to execute the read operation when the third portion of stored data is not included.

20 Claims, 4 Drawing Sheets

SOLID STATE DRIVE WITH CONCURRENT READ EXECUTION AND ERASE EXECUTION

RELATED APPLICATION

The present U.S. non-provisional patent application is related to and claims priority benefit of an earlier-filed U.S. provisional patent application titled "Solid-State Drive with Concurrent Read Execution and Erase Execution," Ser. No. 63/686,983, filed Aug. 26, 2024. The entire content of the identified earlier-filed application is incorporated by reference as if fully set forth herein.

FIELD

The present disclosure relates to solid-state drives and methods of implementing them, and more particularly, the various examples described herein concern a solid-state drive capable of executing a read operation concurrent with executing an erase operation, and a method of executing a read operation concurrent with executing an erase operation in a solid-state drive.

BACKGROUND

Solid-state drives (SSD) use non-volatile memory (NVM) media (e.g., NAND-based memory media) for data storage, and typically include application-specific integrated circuit (ASIC) controllers for managing read, write, and other operations. SSDs are typically used in enterprise computing data center solutions (DCS) and certain high-performance computing (HPC) applications, including artificial intelligence (AI). It is generally desirable to improve the performance and reduce the cost of SSDs, but it can be difficult to do so.

This background discussion is intended to provide related information, and is not necessarily prior art.

SUMMARY

Examples provide an SSD capable of executing a read operation concurrent with executing an erase operation, and a method of executing a read operation concurrent with executing an erase operation in an SSD. Broadly, an NVM pre-read operation is performed before an erase operation is begun, identified first data is copied to a page buffer or other memory register, and if, during a subsequent erase operation, a read request is received for the first data, then the read request is fulfilled from the register without interrupting the erase operation. The memory register may be internal to the NVM media, internal to the SSD's controller, or external to both the NVM media and the controller. Examples advantageously improve reliability and system yield through improved NAND-block budgeting, particularly at the end of the SSD's life cycle.

In an example, a method of executing a read operation concurrent with executing an erase operation in an SSD may include the following operations. A first portion of data stored in an NVM of the SSD may be identified, wherein the first portion of data is predicted to be the subject of a potential read request, and the first portion of data may be copied to a memory register. Subsequently, an erase operation may be executed involving a second portion of data stored in the NVM media. While executing the erase operation, an actual read request may be received involving a third portion of data stored in the NVM media. When the third portion of data is included in the first portion of data in the memory register, the read request may be executed concurrent with (i.e., without suspending) the erase operation. However, when the third portion of data is not included in the first portion of data in the memory register, the erase operation may be suspended and the read request may be executed.

In another example, an SSD capable of executing a read operation concurrent with executing an erase operation may include an NVM media and a controller. The NVM media may be configured to store data, and the controller may be configured to perform the following functions. A first portion of data stored in the NVM media may be identified, wherein in the first portion of data is predicted to be the subject of a potential read request, and the first portion of data may be copied to a memory register. Subsequently, an erase operation may be executed involving a second portion of data stored in the NVM media. While executing the erase operation, an actual read request may be received involving a third portion of data stored in the NVM media. When the third portion of data is included in the first portion of data in the memory register, the read request may be executed concurrent with (i.e., without suspending) the erase operation. However, when the third portion of data is not included in the first portion of data in the memory register, the erase operation may be suspended and the read request may be executed.

The preceding examples may further include any one or more of the following features. 3. The memory register may be internal to the NVM media, internal to the controller, or external to both the NVM media and the controller. The NVM media may be a NAND-based memory media. The first portion of data may be predicted to be the subject of the potential read request based on when the first portion of data was stored in the NVM media, wherein data that was stored more recently is more likely to be the subject of the potential read request than data that was stored less recently. The first portion of data may be predicted to be the subject of the potential read request based on a frequency at which the first portion of data has previously been read, wherein data that has been read more frequently is more likely to be the subject of the potential read request than data that has been read less recently. The first portion of data may be predicted to be the subject of the potential read request based on a particular type of an operation currently being executed by a host, wherein data that is used by one or more particular types of operations is more likely to be the subject of the potential read request than data that is not used by the one or more particular types of operations. The method operations or the controller functions may further include identifying a plurality of first portions of data stored in the NVM media that have been predicted to be the subjects of potential read requests, and copying the plurality of first portions of data to one or more memory registers.

This summary is not intended to identify essential features of the examples, and is not intended to be used to limit the scope of the claims. These and other aspects of the present examples are described below in greater detail.

DRAWINGS

Examples are described in detail below with reference to the attached drawing figures, wherein.

Figure 1:
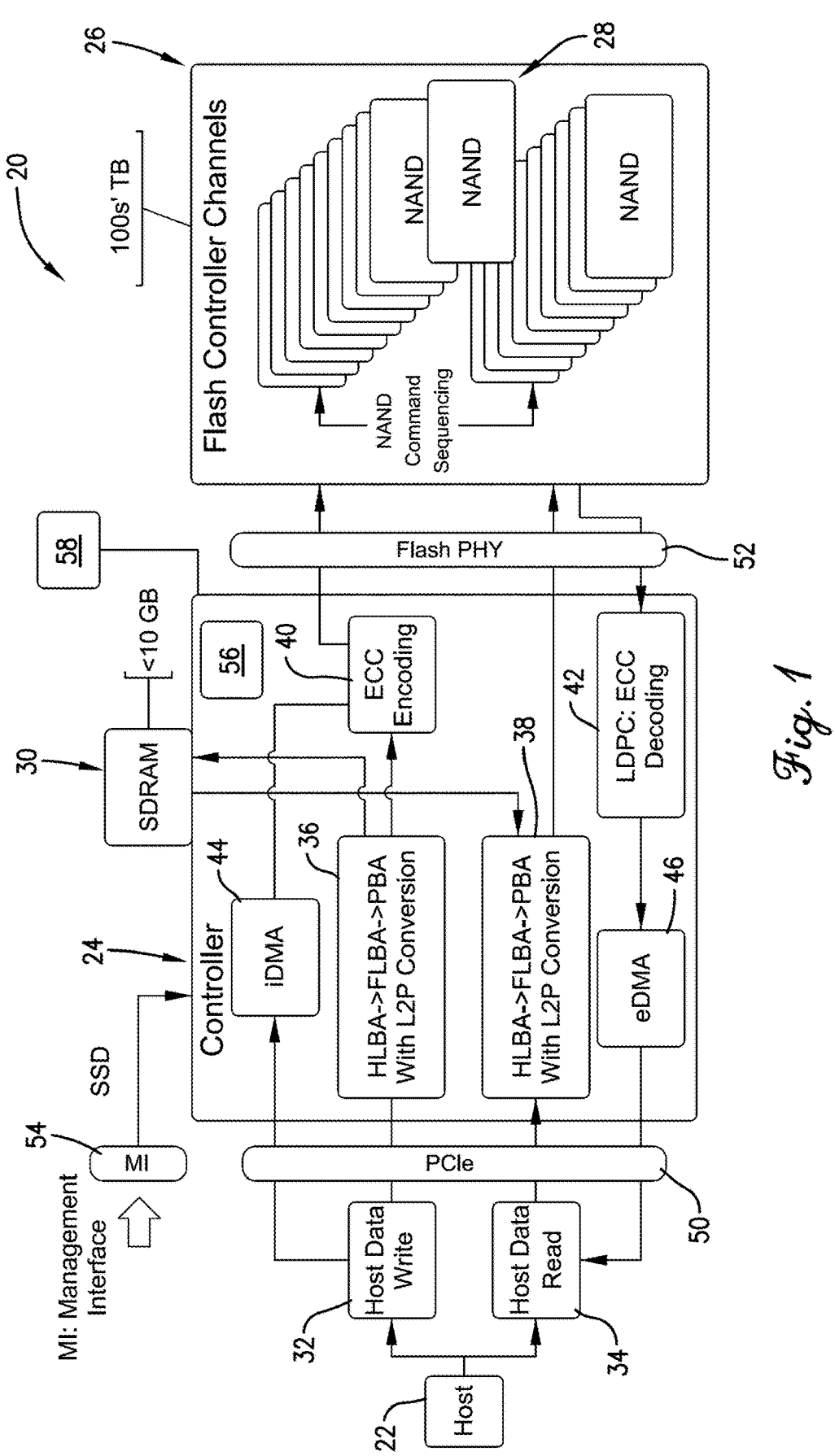
FIG. 1 is a high-level block diagram of components and operations of an example SSD configured to execute a read operation concurrent with executing an erase operation.

The figures are not intended to limit the examples to the specific details depict. The drawings are not necessarily to scale.

DETAILED DESCRIPTION

In the following detailed description, reference is made to the accompanying drawings, which form a part hereof and in which are shown, by way of illustration, specific examples in which the present disclosure may be practiced. These examples are described in sufficient detail to enable a person of ordinary skill in the art to practice the present disclosure. However, other examples may be utilized, and structural, material, procedural, operational, and other changes may be made without departing from the scope of the disclosure. Unless clearly understood or expressly identified otherwise, structures, materials, procedures, operations, and other aspects described in the context of one example may be incorporated into other examples.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, any similarity in numbering does not necessarily mean that the structures or components are necessarily identical in size, composition, configuration, or any other property.

Terms of relative location and direction (e.g., above, below, left, right, upper, lower) may be used to facilitate the present descriptions of examples with reference to the figures, but unless clearly understood or expressly identified otherwise, these terms are not meant to be limiting with regard to location, direction, or overall orientation, and may, for example, change as a result of a change in overall orientation.

It will be readily understood that the components of the examples as generally described herein and illustrated in the drawings could be arranged and designed in a wide variety of different configurations. Thus, the following description of various examples is not intended to limit the scope of the present disclosure but is merely representative of various examples.

Examples provide an SSD capable of executing a read operation concurrent with executing an erase operation, and a method of executing a read operation concurrent with executing an erase operation in an SSD. Broadly, an NVM pre-read operation is performed before an erase operation is begun, first data is copied to a page buffer or other memory register, and if, during a subsequent erase operation, a read request is received for the first data, then the read request is fulfilled from the register without interrupting the erase operation. The memory register may be internal to the NVM media, internal to the controller, or external to both the NVM media and the controller. Examples advantageously improve reliability and system yield through improved NAND-block budgeting, particularly at the end of the SSD's life cycle.

Referring to FIG. 1, a high-level block diagram of components, operations, and an operating context of an SSD 20 is shown including a host 22 configured to write and read data to and from the SSD 20; a controller 24 configured to control various SSD operations, such as those discussed below; and an NVM media 26, such as a NAND-based memory media in the form of a plurality of NAND dies 28. Each NAND die may include one or more planes, each plane may include multiple blocks, each block may include multiple pages, and each page may include multiple cells. Each block may be arranged as an array of wordlines (WLs) and bitlines (BLs), with each WL representing a page. Although described herein with regard to NAND-based memory media, examples may employ substantially any suitable memory array technology, such as NOR-based memory media and dynamic random access memory (DRAM).

Generally, the SSD 20 may operate as follows. A write or read request may be received from the host 22 via a peripheral component interconnect express (PCIe) or other suitable interface 50. PCIe is a standardized interface for motherboard components. The controller 24 may use logical block addresses (LBAs) and physical block addresses (PBAs) to facilitate access for data storage in and retrieval from the NVM 26. LBAs are an abstraction to allow the operating system to interact with the NVM 26, and PBAs represent the actual hardware locations within the NVM 26. To facilitate interacting with the NVM 26, the controller 24 may create an entry or record that assigns an LBA to a PBA. To keep track of all such LBA-to-PBA assignments, the controller 24 may use a logical-to-physical (L2P) mapping table. The L2P table may be uploaded to synchronous dynamic random access memory (SDRAM) 30 so that it can be more quickly accessed and updated by the controller 24. When a write or read data request 32, 34 is received from the host 22, the controller 24 performs a reference operation 36, 38 to the L2P mapping table to determine the PBA within the NVM corresponding to a desired LBA. Once the PBA is determined, the controller 24 accesses the appropriate NVM cell to write or read the data. Access to the NVM 26 may be via a flash physical (PHY) or other suitable interface 52. The controller 24 may employ an error correction code (ECC) operation 40, 42 during encoding and decoding of data to detect and correct errors and enhance data integrity. Additionally, the SSD 20 may support a direct memory access (DMA) operation 44, 46 enabling data to be written from the host 22 directly to the NVM 26 and read from the NVM 26 directly to the host 22. Certain commands, such as the disablement commands described herein, may be issued to the controller 24 using the host command layer, or non-volatile memory express management (NVMe-MI) or other suitable interface 54.

Figure 2:
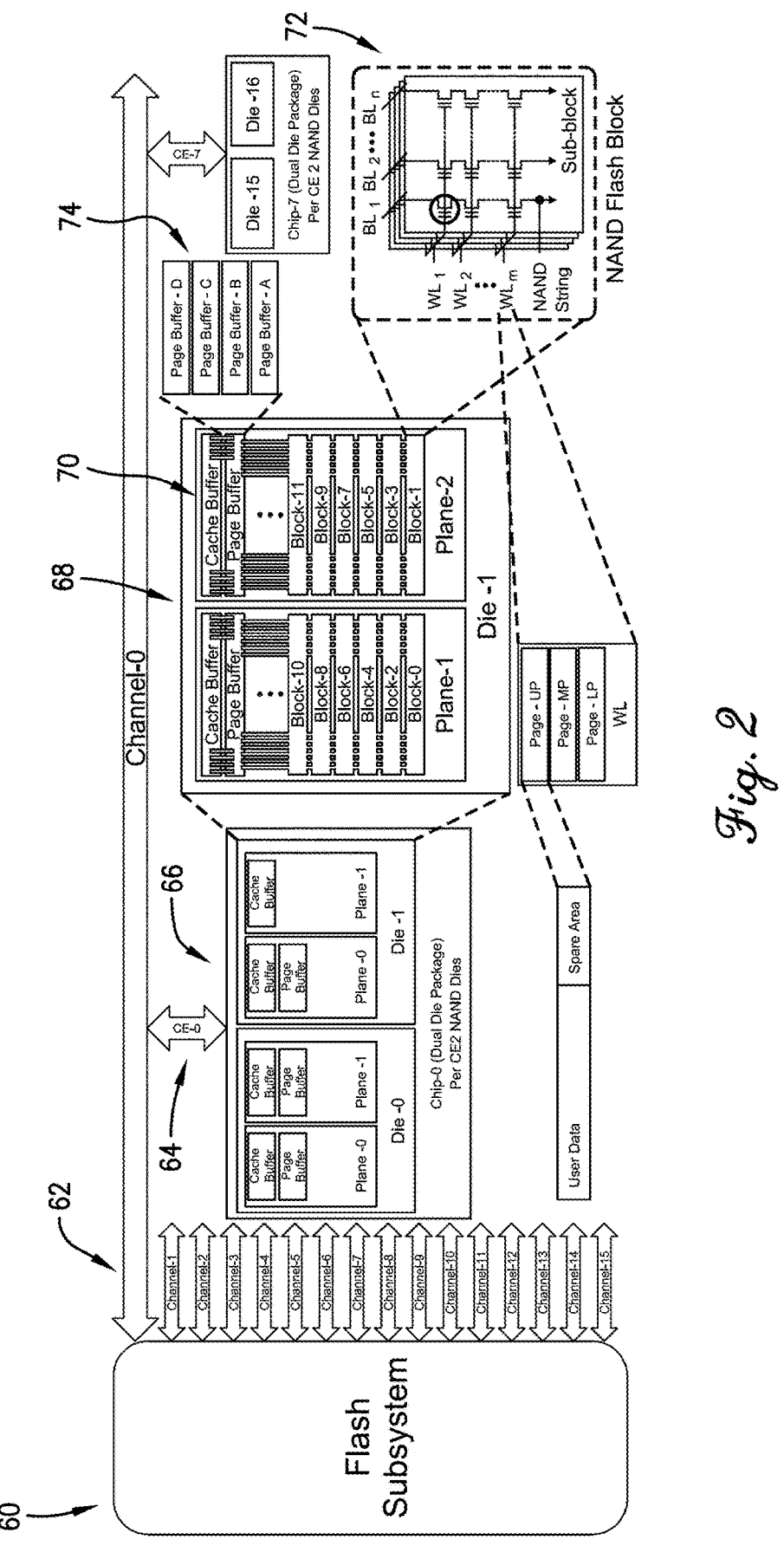
FIG. 2 is a high-level depiction of components of an NVM media of the SSD of FIG. 1.

Referring to FIG. 2, a flash subsystem 60 comprises multiple (e.g., sixteen (16)) channels 62. Each channel has multiple (e.g., eight (8)) chip-enable (CE) input lines 64. Each CE is connected to one (1) NAND dual die package 66, i.e., each CE accesses two (2) NAND dies. Each NAND die 68 has multiple (e.g., two (2)) planes 70. Each plane comprises many blocks 72 and their corresponding page buffers 74 (e.g., four (4) page buffers: A, B, C & D). Each NAND block comprises a plurality of vertically-connected NAND cells (e.g., 3D NAND has approximately between two hundred (200) and three hundred (300) cells). Each NAND string is connected to a BL. Each NAND block has many (e.g., four (4), six (6), or eight (8)) sub-blocks. The control gates of all memory cells that are at the same vertical location in a sub-block are connected to the same WL, which makes all such cells operate concurrently. The blocks in a plane share all of the BLs in that plane, so a single BL is shared by thousands of NAND strings.

The erase operation is a relatively slow block-level operation requiring approximately between five (5) and twenty (20) milliseconds (ms). The erase operation involves applying a strong electric field that can damage an insulating oxide layer and lead to poor reliability and reduced endurance and working life of the drive. The execution of an erase operation after multiple incomplete erase operations, which happens during erasure suspension events, can cause even more severe damage to the insulating oxide layer and lead to poor reliability, reduced working life, and an increase in bad blocks (i.e., a loss of system yield) as the drive ages. Further, multiple erasure suspension events can occur without forward progress. Conventionally, SSDs interrupt or suspend erase operations when the host issues a read request. This interruption can cause severe memory cell degradation and lead to poor reliability, poor system yield, and reduced service life of the SSDs. In particular, suspending and resuming the erase operation can lead to poor reliability, such as multiple erase pulses without forward progress, and latencies (of, e.g., approximately one hundred microseconds ($100$ $\mu$s)) associated with the suspension. Further, even if the requested read operation is critical to the host's performance, the NVM may be required to wait for a significant period of time to suspend the ongoing erase operation, depending on the status of the erase pulse.

Figure 3:
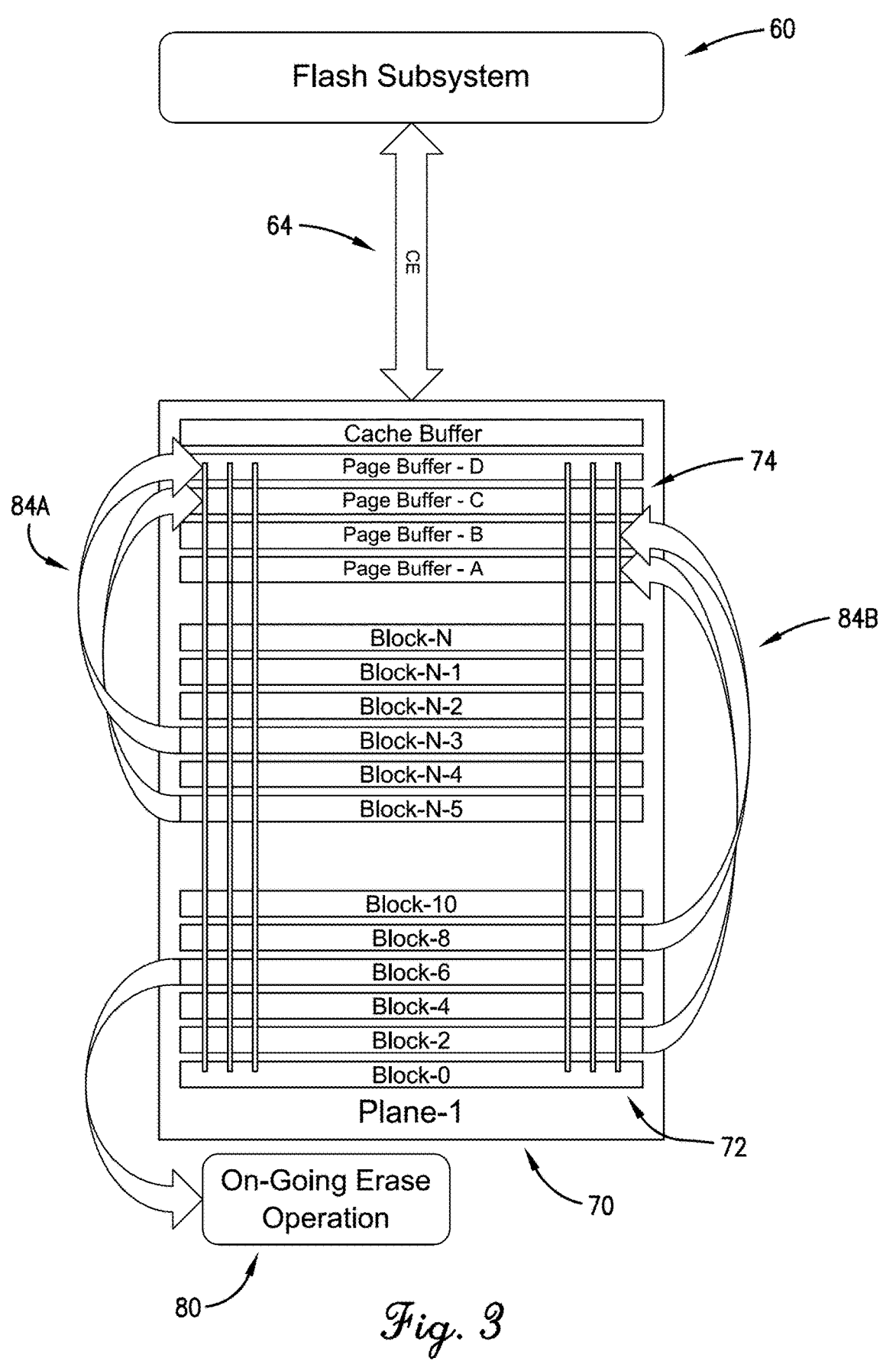
FIG. 3 is a high-level depiction of a pre-read operation involved in the SSD of FIG. 1 executing a read operation concurrent with executing an erase operation.

Referring to FIG. 3, examples enabling the SSD 20 to execute a read operation concurrent with executing an erase operation may include the functions described below. Some or all of the functions of the SSD 20 may be reflected in the operations of the method 220 described below. Broadly, an incoming host read workload is predicted based on past read statistics or other predictive information, and this prediction is used to temporarily copy some data into the NAND page buffers or other memory registers 74 before executing the erase operation. More specifically, a pre-read operation is performed before the erase operation is begun. One or more first portions of data from certain NAND dies 68 and planes 70 are temporarily copied 84A, 84B to page buffers or other memory registers 74 based on the likelihood that the data will be read during the NAND erase operation. Each first portion of data may be predicted to be the subject of the potential read request based on such factors as when the first portion of data was stored in the NVM media 26 (wherein data that was stored more recently is more likely to be the subject of the potential read request than data that was stored less recently); a frequency at which the first portion of data has previously been read (wherein data that has been read more frequently is more likely to be the subject of the potential read request than data that has been read less recently); a particular type of an operation currently being executed by the host 22 (wherein data that is used by one or more particular types of operations is more likely to be the subject of the potential read request than data that is not used by the one or more particular types of operations); inclusion in a group or sequence of data being read out (wherein data that is upcoming in a current group or sequence of data being read out is more likely to be the subject of the potential read request than data that is not part of the group or sequence); or based on an instruction or other guidance from the host 22.

The amount of data temporarily copied may depend on the number of memory registers available per plane. In the example shown in FIG. 3, there are four (4) page buffers, so up to sixteen (16) kilobytes (KB)×four (4)=sixty-four (64) KB of data can be stored per page. The firmware may make a note of the data that is available in the memory registers 74. Although the memory registers are generally described herein as being internal to the NVM component of the SSD, it will be understood that they may additionally or alternatively be external to the NVM component and internal or external to the controller 24. For example, the controller 24 may include one or more types of memory registers 56 that are internal to the controller 24, such as block random access memory (BRAM), and/or the controller 24 may have access to one or more types of memory registers 58 that are external to both the controller 24 and the NVM media 26, such as double data rate dynamic random access memory (DDR DRAM).

Subsequently, when a read request is received while the erase operation is in progress, if all of the requested data is part of the first portions of data temporarily copied into and therefore available from the memory registers 74, then the read request can be fulfilled concurrently with (i.e., without suspending) the erase operation. If none or only some of the requested data is part of the first portions of data, then the erase operation may need to be suspended to fulfill the read request. Examples significantly improve reliability and system yield through improved NAND block budgeting, particularly at the end of the SSD's life.

Figure 4:
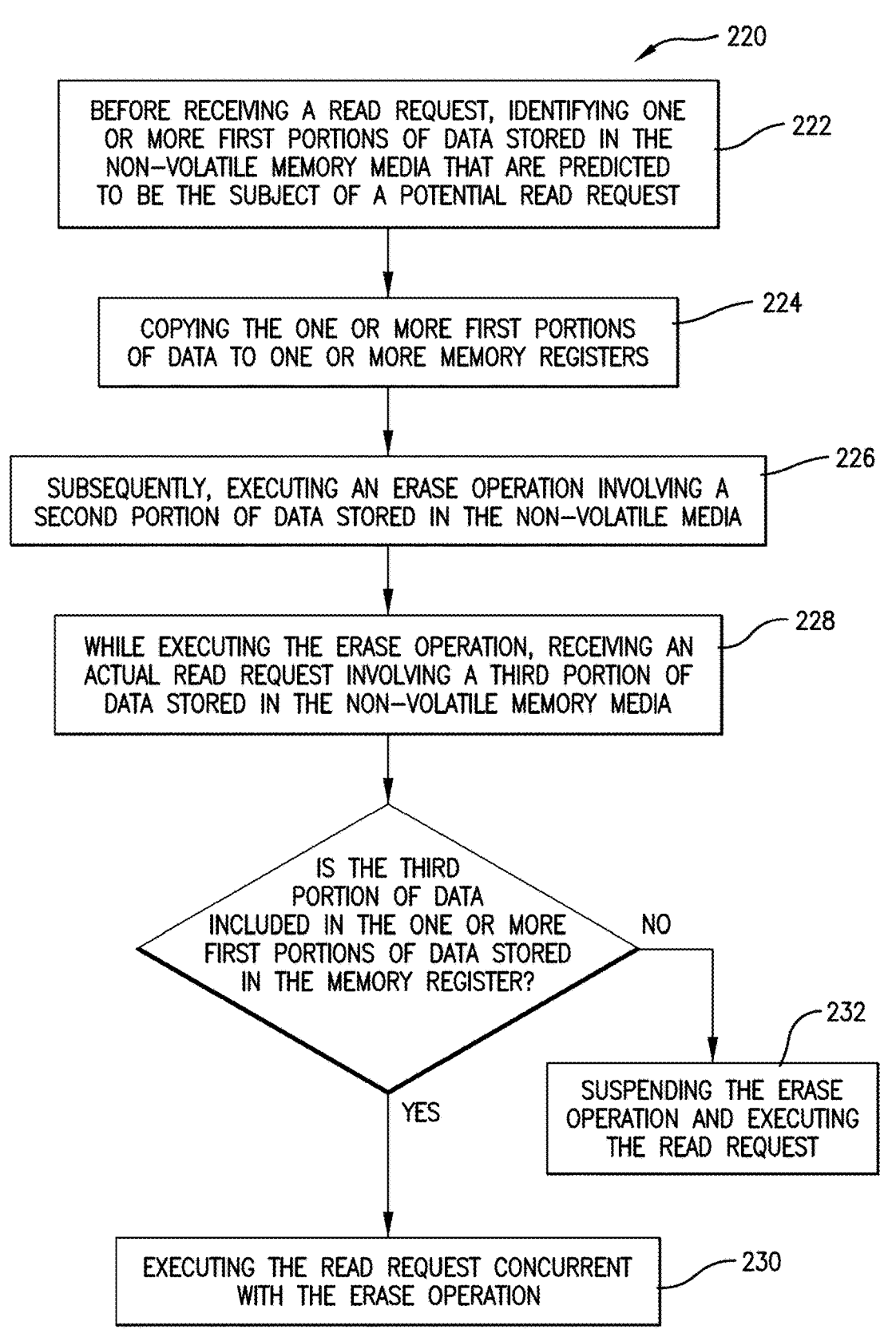
FIG. 4 is a flowchart of operations in an example of a method of executing a read operation concurrent with executing an erase operation in an SSD.

Referring to FIG. 4, an example of a method 220 of executing a read operation concurrent with executing an erase operation in an SSD may include the operations discussed below. The SSD 20 may include a controller 24 and a NAND-based or other NVM media 26. Some or all of the operations of the method 220 may be reflected the functions of the SSD 20 described above.

Before receiving a read request, one or more first portions of data stored in the NVM media 26 may be identified that are predicted to be the subjects of a potential read request, as shown in 222, and these first portions of data may be copied to one or more page buffers or other memory registers 74, as shown in 224 (and as depicted in 84A and 84B of FIG. 3). As discussed, although generally described herein as being internal to the NVM media 26, the memory registers may be external to the NVM media 26 and internal or external to the controller 24. Each first portion of data may be predicted to be the subject of the potential read request based on such factors as when the first portion of data was stored in the NVM media (wherein data that was stored more recently is more likely to be the subject of the potential read request than data that was stored less recently); a frequency at which the first portion of data has previously been read (wherein data that has been read more frequently is more likely to be the subject of the potential read request than data that has been read less recently); a particular type of an operation currently being executed by a host 22 (wherein data that is used by one or more particular types of operations is more likely to be the subject of the potential read request than data that is not used by the one or more particular types of operations); inclusion in a group or sequence of data being read out (wherein data that is upcoming in a current group or sequence of data being read out is more likely to be the subject of the potential read request than data that is not part of the group or sequence); or based on an instruction or other guidance from the host 22.

Subsequently, an erase operation may be executed involving a second portion of data stored in the NVM media 26, as shown in 226. While executing the erase operation, an actual read request may be received involving a third portion of data stored in the non-volatile memory media, as shown in 228. When the entire third portion of data is included in the first portion of data temporarily copied into the memory register 74, the read request may be executed concurrent with (i.e., without suspending) the erase operation, as shown in 230. However, when none or only part of the third portion of data is included in the first portion of data in the memory register 74, the erase operation may be suspended so that the read request can be executed, as shown in 232.

While the present disclosure has been described herein with respect to certain illustrated examples, those of ordinary skill in the art will recognize and appreciate that the present disclosure is not so limited. Rather, many additions, deletions, and modifications to the illustrated and described examples may be made without departing from the scope of the disclosure as hereinafter claimed along with their legal equivalents. In addition, features from one example may be combined with features of another example while still being encompassed within the scope of the disclosure as contemplated by the inventors.

The invention claimed is:

1. A method of executing a read operation concurrent with executing an erase operation in a solid-state drive, the solid-state drive including a non-volatile memory media, the method comprising:
   identifying a first portion of data stored in the non-volatile memory media, wherein the first portion of data is predicted to be the subject of a potential read request;
   copying the first portion of data to a memory register;
   executing an erase operation involving a second portion of data stored in the non-volatile memory media;
   receiving an actual read request involving a third portion of data stored in the non-volatile memory media while executing the erase operation;
   executing the actual read request concurrent with the erase operation when the third portion of data is included in the first portion of data in the memory register; and
   suspending the erase operation and executing the actual read request when the third portion of data is not included in the first portion of data in the memory register.

2. The method of claim 1, wherein the non-volatile memory media is a NAND-based memory media.

3. The method of claim 1, wherein the memory register is internal to the non-volatile memory media.

4. The method of claim 1, wherein the memory register is internal to the controller.

5. The method of claim 1, wherein the memory register is external to the non-volatile memory media and external to the controller.

6. The method of claim 1, wherein the first portion of data is predicted to be the subject of the potential read request based on when the first portion of data was stored in the non-volatile memory media, wherein data that was stored more recently is more likely to be the subject of the potential read request than data that was stored less recently.

7. The method of claim 1, wherein the first portion of data is predicted to be the subject of the potential read request based on a frequency at which the first portion of data has previously been read, wherein data that has been read more frequently is more likely to be the subject of the potential read request than data that has been read less recently.

8. The method of claim 1, wherein the first portion of data is predicted to be the subject of the potential read request based on a particular type of an operation currently being executed by a host, wherein data that is used by one or more particular types of operations is more likely to be the subject of the potential read request than data that is not used by the one or more particular types of operations.

9. The method of claim 1, further including—
   identifying a plurality of first portions of data stored in the non-volatile memory media that have been predicted to be the subjects of potential read requests; and
   copying the plurality of first portions of data to one or more memory registers.

10. A method of executing a read operation concurrent with executing an erase operation in a solid-state drive, the solid-state drive including a NAND-based memory media, the method comprising:
    identifying a plurality of first portions of data stored in the NAND-based memory media that are predicted to be the subjects of potential read requests, wherein the plurality of first portions of data are predicted to be the subjects of the potential read requests based on one or more of when the first portion of data was stored in the NAND-based memory media, a frequency at which the first portion of data has been read, and a particular type of an operation currently being executed by a host;
    copying the plurality of first portions of data to one or more memory registers, executing an erase operation involving a second portion of data stored in the NAND-based memory media;
    receiving an actual read request involving a third portion of data stored in the NAND-based memory media while executing the erase operation;
    executing the actual read request without suspending the erase operation when the third portion of data is included in at least one of the plurality of first portions of data in the one or more memory registers; and
    suspending the erase operation and executing the actual read request when the third portion of data is not included in at least one of the plurality of first portions of data in the one or more memory registers.

11. The method of claim 10, wherein the one or more memory registers are internal to the NAND-based memory media.

12. A solid-state drive capable of executing a read operation concurrent with executing an erase operation, the solid-state drive comprising:
    a non-volatile memory media configured to store data; and
    a controller configured to perform a plurality of functions including:
       identifying a first portion of data stored in the non-volatile memory media, wherein the first portion of data has been predicted to be the subject of a potential read request;
       copying the first portion of data to a memory register;
       executing an erase operation involving a second portion of data stored in the non-volatile memory media;
       receiving an actual read request involving a third portion of data stored in the non-volatile memory media while executing the erase operation;
       executing the actual read request without suspending the erase operation when the third portion of data is included in the first portion of data in the memory register; and
       suspending the erase operation and executing the actual read request when the third portion of data is not included in the first portion of data in the memory register.

13. The solid-state drive of claim 12, wherein the non-volatile memory media is a NAND-based memory media.

14. The solid-state drive of claim 12, wherein the memory register is internal to the non-volatile memory media.

15. The solid-state drive of claim 12, wherein the memory register is internal to the controller.

16. The solid-state drive of claim 12, wherein the memory register is external to the non-volatile memory media and external to the controller.

17. The solid-state drive of claim 12, wherein the first portion of data is predicted to be the subject of the potential read request based on when the first portion of data was stored in the non-volatile memory media, wherein data that was stored more recently is more likely to be the subject of the potential read request than data that was stored less recently.

18. The solid-state drive of claim 12, wherein the first portion of data is predicted to be the subject of the potential read request based on a frequency at which the first portion of data has been read, wherein data that has been read more frequently is more likely to be the subject of the potential read request than data that has been read less recently.

19. The solid-state drive of claim 12, wherein the first portion of data is predicted to be the subject of the potential read request based on a particular type of an operation currently being executed by a host, wherein data that is used by one or more particular types of operations is more likely to be the subject of the potential read request than data that is not used by the one or more particular types of operations.

20. The solid-state drive of claim 12, the plurality of functions performed by the controller further including— identifying a plurality of first portions of data stored in the non-volatile memory media that have been predicted to be the subjects of potential read requests;

copying the plurality of first portions of data to one or more memory registers.

* * * * *